US008504011B2

(12) United States Patent
Gao et al.

(10) Patent No.: US 8,504,011 B2
(45) Date of Patent: Aug. 6, 2013

(54) METHOD AND SYSTEM FOR MOBILITY PARAMETER NEGOTIATION BETWEEN BASE STATIONS

(75) Inventors: Yin Gao, Shenzhen (CN); Jianmin Fang, Shenzhen (CN)

(73) Assignee: ZTE Corporation, Shenzhen (CN)

( * ) Notice: Subject to any disclaimer, the term of this patent is extended or adjusted under 35 U.S.C. 154(b) by 0 days.

(21) Appl. No.: 13/258,358

(22) PCT Filed: May 12, 2010

(86) PCT No.: PCT/CN2010/072662
§ 371 (c)(1),
(2), (4) Date: May 30, 2012

(87) PCT Pub. No.: WO2010/148801
PCT Pub. Date: Dec. 29, 2010

(65) Prior Publication Data
US 2012/0264417 A1    Oct. 18, 2012

(30) Foreign Application Priority Data

Dec. 30, 2009   (CN) .......................... 2009 1 0215207

(51) Int. Cl.
*H04W 4/00*   (2009.01)
(52) U.S. Cl.
USPC ..................... 455/422.1; 455/436; 455/435.2; 455/443; 370/331; 370/338
(58) Field of Classification Search
USPC ................ 455/436, 435.2, 443; 370/331, 338
See application file for complete search history.

(56) References Cited

U.S. PATENT DOCUMENTS

| 2010/0046476 | A1* | 2/2010 | Qiu ............................... 370/331 |
| 2011/0075675 | A1* | 3/2011 | Koodli et al. ................. 370/401 |
| 2011/0117908 | A1* | 5/2011 | Huang et al. .................. 455/423 |

FOREIGN PATENT DOCUMENTS

| CN | 101594681 A | 12/2009 |
| WO | 2008060119 A1 | 5/2008 |
| WO | 2009099215 A1 | 8/2009 |

OTHER PUBLICATIONS

International Search Report in international application No. PCT/CN2010/072662, mailed on Oct. 21, 2010.

(Continued)

*Primary Examiner* — Kwasi Karikari
(74) *Attorney, Agent, or Firm* — Oppedahl Patent Law Firm LLC (57) ABSTRACT

The disclosure discloses a method for mobility parameter negotiation between base stations (BSs). A target BS performs a mobility parameter decision and an optimization processing after receiving a mobility parameter modification request message from a source BS. When the processing succeeds, the target BS sends a mobility parameter modification acknowledgement message at least carrying a message type and a source cell ID to the source BS; when it fails, the target BS sends a mobility parameter modification failure message at least carrying a message type, a reason of failure, and the source cell ID to the source BS. A system for mobility parameter negotiation between BSs is also provided. Through the disclosure, the source BS is able to precisely recognize which source cell the mobility handover parameter negotiation is performed to, and further precisely knows which target cell the negotiation message comes from, thereby avoiding the inconsistency of the mobility parameter modification caused by message disorder, improving robustness of the mobility parameter modification and enhancing the network performance.

16 Claims, 6 Drawing Sheets

OTHER PUBLICATIONS

English Translation of the Written Opinion of the International Search Authority in international application No. PCT/CN2010/072662, mailed on Oct. 21, 2010.
3GPP TS 36.423 V9.1.0 Dec. 18, 2009.
3GPP TS 36.423 V9.2.0 Apr. 6, 2010.
3rd Generation Partnership Project; Technical Specification Group GSM/EDGE Radio Access Network; Packet-switched handover for GERAN A/Gb mode; Stage 2 (Release 9) Dec. 12, 2009.

* cited by examiner

| Element | Description |
|---|---|
| Message type | |
| Source cell ID | Cell global identifier |
| Target cell ID | Cell global identifier (optional information) |
| Source base station ID | Base station global identifier (optional information) |
| Target base station ID | Base station global identifier (optional information) |

Fig. 3

| Element | Description |
|---|---|
| Message type | |
| Allowed regulation range of target cell mobility parameter | Allowed regulation range of target cell mobility parameter (optional information) |
| Reason of failure | Reason of failure of target cell mobility parameter modification |
| Source cell ID | Cell global identifier |
| Target cell ID | Cell global identifier (optional information) |
| Source base station ID | Base station global identifier (optional information) |
| Target base station ID | Base station global identifier (optional information) |

METHOD AND SYSTEM FOR MOBILITY PARAMETER NEGOTIATION BETWEEN BASE STATIONS

TECHNICAL FIELD

The present disclosure relates to the field of wireless communication technology, and in particular to a method and system for mobility parameter negotiation between base stations.

BACKGROUND

Long Term Evolution (LTE) network of 3G mobile communication comprises an Evolved Universal Terrestrial Radio Access Network (E-UTRAN) and an Evolved Packet Core (EPC) network. The E-UTRAN includes a set of Evolved NodeBs (eNBs). The EPC includes a Mobile Management Entity (MME) and a Serving Gateway (S-GW) etc., and therefore the network architecture is flat. The eNBs and the MME/S-GW are connected through S1 interface. The eNBs may be connected to each other through X2 interface. S1 interface and X2 interface are logical interfaces. A MME/S-GW can manage one or more eNBs, and an eNB can be controlled by a plurality of MMEs/S-GWs. In addition, an eNB can manage one or more cells. LTE advanced (LTE-A) system is evolved from the LTE system and has the same network architecture with the LTE. The difference between LTE-A and LTE is that some new technologies such as coordinated multi-point, spectrum aggregation and relay are applied to LTE-A to enhance the system performance.

In order to reduce costs of network construction and operation, the trend of the next generation mobile network is consequentially self-configuration, self-optimization, and less and less manual intervention. Therefore, the concept of self-organized network (SON) is introduced, which includes a mobility load balancing optimization (MLB) and a mobility robustness optimization (MRO) etc.

Such optimizations as the MLB and the MRO may result in modification of cell mobility parameter, thus a negotiation mechanism is required to coordinate the modification of the mobility parameter of two related adjacent cells between eNBs. The current negotiation process for mobility parameter modification consists of a request message, an acknowledgement message and a failure message. When a mobility parameter negotiation is required, the source base station where the source cell locates sends a mobility parameter modification request message to the target base station where the target cell locates. The mobility parameter modification request message comprises a cell ID of the source cell, a cell ID of the target cell, and the mobility parameter information of the source base station per se, the mobility parameter information which the target base station suggests modifying, and the cause of the mobility parameter negotiation, wherein a cell ID is the cell global identifier which can uniquely determine a cell. If the target base station modifies the parameter successfully, a mobility parameter modification acknowledgement message is returned. Otherwise, a mobility parameter modification failure message is returned. The mobility parameter modification failure message includes: a reason of failure, and a mobility parameter range which the target base station allows to be modified.

However, since the information (including the cell ID of the source cell and the cell ID of the target cell) of the negotiated cells pair is included only in the request message and is not included in the acknowledgement message and the failure message during the current negotiation process, it causes the following problems: when a plurality of service cells under the current source base station initiate a mobility parameter negotiation to the cells of other base stations, if the source base station receives acknowledgement/failure message from a plurality of target base stations/target cells, the source base station may not be able to recognize which source cell the mobility handover parameter negotiation is performed to. In addition, when the service cells of a source base station initiate in parallel mobility parameter negotiation processes for a plurality of target cells, the source base station may fail to know which target cell a negotiation message comes from via the address of the transport layer, and it may further fail to know which target cell the acknowledgement/failure message comes from. Consequently, the above problem will result in message disorder and finally result in inconsistency of mobility parameter modification between the cells pair, which causes cell mobility parameter modification error and degrade the network performance.

SUMMARY

In view of this, the main purpose of the present disclosure is to provide a method and system for mobility parameter negotiation between base stations, which may avoid inconsistency of mobility parameter modification caused by message disorder so as to improve robustness of mobility parameter modification and enhance network performance.

In order to achieve the aforementioned purpose, the present disclosure is realized by the following way:

a method for mobility parameter negotiation between base stations includes:

after receiving a mobility parameter modification request message from a source base station, a target base station performs a mobility parameter decision and an optimization processing according to the mobility parameter modification request message;

when the processing succeeds, the target base station sends a mobility parameter modification acknowledgement message to the source base station, wherein the mobility parameter modification acknowledgement message at least includes a message type and a source cell ID; and when the processing fails, the target base station sends a mobility parameter modification failure message to the source base station, wherein the mobility parameter modification failure message at least includes a message type, a reason of failure, and the source cell ID, wherein the mobility parameter modification acknowledgement message further includes one or more of the following: a target cell ID, a source base station ID and a target base station ID.

The mobility parameter modification failure message further includes one or more of the following: a mobility parameter range which the target cell of the target base station allows to be modified, a target cell ID, a source base station ID, and a target base station ID.

The cell ID is a cell global identifier (ECGI).

The base station ID is a base station global identifier (eNB global ID).

A system for mobility parameter negotiation between base stations includes: a source base station and a target base station, wherein the target base station is configured to perform a mobility parameter decision and an optimization processing according to a mobility parameter modification request message after receiving the mobility parameter modification request message from the source base station;

when the processing succeeds, the target base station sends a mobility parameter modification acknowledgement message to the source base station, wherein the mobility parameter modification acknowledgement message at least includes a message type and a source cell ID; and when the processing fails, the target base station sends a mobility parameter modification failure message to the source base station, wherein the mobility parameter modification failure message at least includes a message type, a reason of failure, and the source cell ID.

The mobility parameter modification acknowledgement message sent by the target base station to the source base station further includes one or more of the following: a target cell ID, a source base station ID, and a target base station ID.

The mobility parameter modification failure message sent by the target base station to the source base station further includes one or more of the following: a mobility parameter range which the target cell of the target base station allows to be modified, the target cell ID, the source base station ID, and the target base station ID.

The cell ID in the mobility parameter modification acknowledgement message or the mobility parameter modification failure message sent by the target base station to the source base station is an ECGI.

The base station ID in the mobility parameter modification acknowledgement message or the mobility parameter modification failure message sent by the target base station to the source base station is an eNB global ID.

The method and system for mobility parameter negotiation between base stations adds a source cell ID, or a source cell ID and a target cell ID to the mobility parameter modification acknowledgement message and/or mobility parameter modification failure message, thereby enabling the source base station to recognize accurately which source cell the mobility handover parameter negotiation is performed to and to know accurately which target cell the negotiation message comes from, thus avoiding the inconsistency of the mobility parameter modification caused by the message disorder, improving robustness of mobility parameter modification and enhancing network performance.

DETAILED DESCRIPTION

According to the background of the disclosure, the purpose of the present disclosure is to provide a simple and effective method for performing mobility parameter negotiation of two adjacent cells between eNBs while ensuring that messages of multiple negotiation processes would not have mutual interference, so that the source cell of the source base station may avoid the message disorder, and accurately distinguish equivalent mobility parameter modification acknowledgement/failure message so as to enhance the robustness of the existing mobility parameter modification negotiation process, and may further avoid error modification of mobility parameter between adjacent cells caused by the message disorder during the process.

In order to solve the aforementioned problem, the present disclosure provides a method and system for performing a mobility parameter negotiation optimization process between adjacent cells in LTE/LTE-A system: a source cell ID or a source cell ID and a target cell ID is added to the mobility parameter modification acknowledgement and/or failure message, so that the source base station may recognize accurately which source cell the mobility handover parameter negotiation is performed to and distinguish accurately which target cell the negotiation message comes from, so as to avoid the inconsistency of the mobility parameter modification caused by the message disorder, thereby improving the robustness of the mobility parameter modification, and enhancing the network performance.

Embodiments are further described in details according to the drawings hereinafter.

Figure 1:
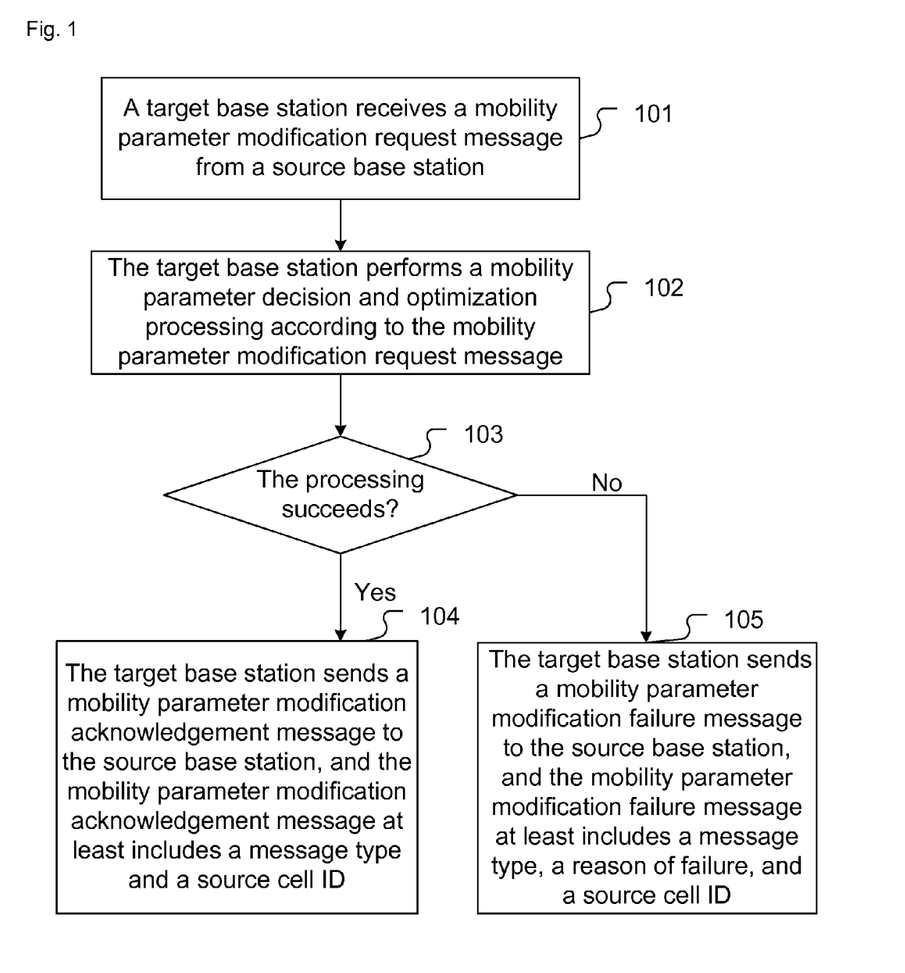
FIG. 1 shows a schematic diagram of a method for mobility parameter negotiation between base stations of the present disclosure.

FIG. 1 shows a schematic diagram of a method for mobility parameter negotiation between base stations. As shown in FIG. 1, the method comprises:

Step 101: a target base station receives a mobility parameter modification request message from a source base station.

Step 102: the target base station performs a mobility parameter decision and an optimization processing according to the mobility parameter modification request message.

Step 103: the target base station judges whether or not the processing is successful, if yes, then turn to Step 104, otherwise, turn to Step 105.

Step 104: the target base station sends a mobility parameter modification acknowledgement message to the source base station, wherein the mobility parameter modification acknowledgement message at least includes message type and source cell ID; and then, the process ends.

Figure 2:
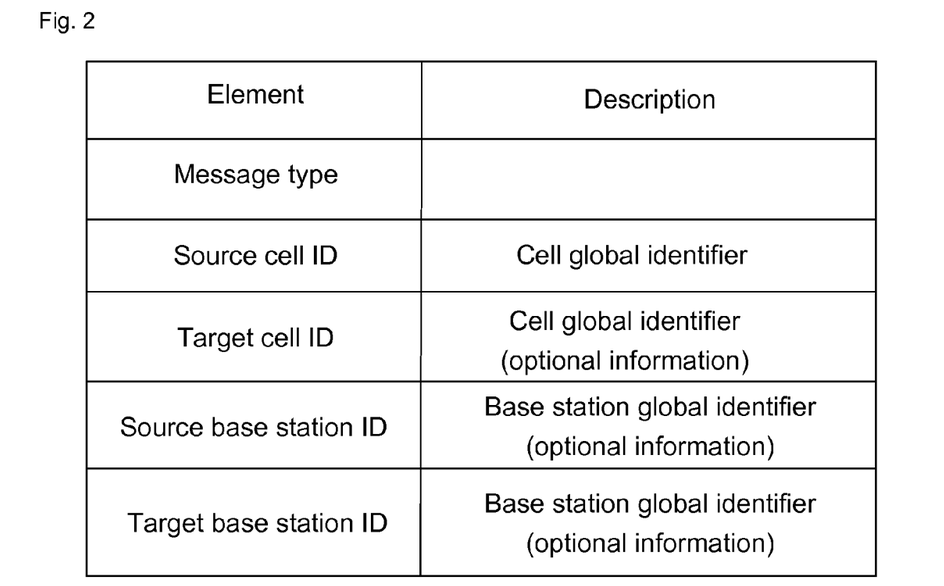
FIG. 2 shows a structural schematic diagram of a mobility parameter modification acknowledgement message of the present disclosure.

FIG. 2 shows a structural schematic diagram of a mobility parameter modification acknowledgement message of the present disclosure. As shown in FIG. 2, in the present disclosure, the mobility parameter modification acknowledgement message at least comprises a message type and a source cell ID. Further, the mobility parameter modification acknowledgement message may comprise one or more of the following: a target cell ID, a source base station ID, and a target base station ID.

Step 105: the target base station sends a mobility parameter modification failure message to the source base station, wherein the mobility parameter modification failure message at least includes a message type, a reason of failure, and a source cell ID; and then, the process ends.

Figure 3:
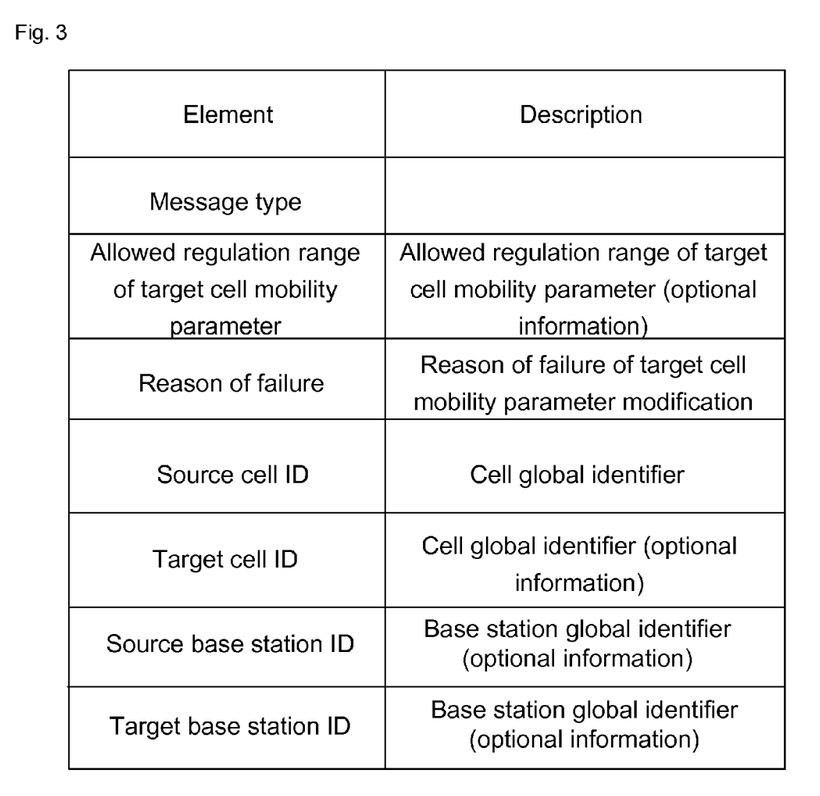
FIG. 3 shows a structural schematic diagram of a mobility parameter modification failure message of the present disclosure.

FIG. 3 shows a structural schematic diagram of a mobility parameter modification failure message of the present disclosure. As shown in FIG. 3, in the present disclosure, the mobility parameter modification failure message at least comprises a message type, a reason of failure, and a source cell ID. Further, the mobility parameter modification failure message may comprise one or more of the following: a mobility parameter range which the target cell of the target base station allows to be modified, a target cell ID, a source base station ID, and a target base station ID.

In the present disclosure, a cell ID is a cell global identifier (ECGI) which can be used for uniquely determining a cell. A base station ID is a base station global identifier, such as base station global identifier (eNB global ID), which can be used for uniquely determining a base station.

The present disclosure further claims a system for mobility parameter negotiation between base stations, comprising a source base station and a target base station, wherein:

The target base station is used for performing a mobility parameter decision and an optimization processing according to a mobility parameter modification request message after receiving the mobility parameter modification request message. When the processing succeeds, the target base station sends a mobility parameter modification acknowledgement message to the source base station, wherein the mobility parameter modification acknowledgement message at least includes a message type and a source cell ID; when the processing fails, the target base station sends a mobility parameter modification failure message to the source base station, wherein the mobility parameter modification failure message at least includes a message type, a reason of failure, and the source cell ID.

The mobility parameter modification acknowledgement message sent by the target base station to the source base station further comprises one or more of the following: a target cell ID, a source base station ID, and a target base station ID.

The mobility parameter modification failure message sent by the target base station to the source base station further comprises one or more of the following: a mobility parameter range which the target cell of the target base station allows to be modified, a target cell ID, a source base station ID, and a target base station ID.

The cell ID in the mobility parameter modification acknowledgement message or the mobility parameter modification failure message sent by the target base station to the source base station is a cell global identifier (ECGI).

The base station ID in the mobility parameter modification acknowledgement message or the mobility parameter modification failure message sent by the target base station to the source base station is an eNB global ID.

EMBODIMENT 1

Figure 4:
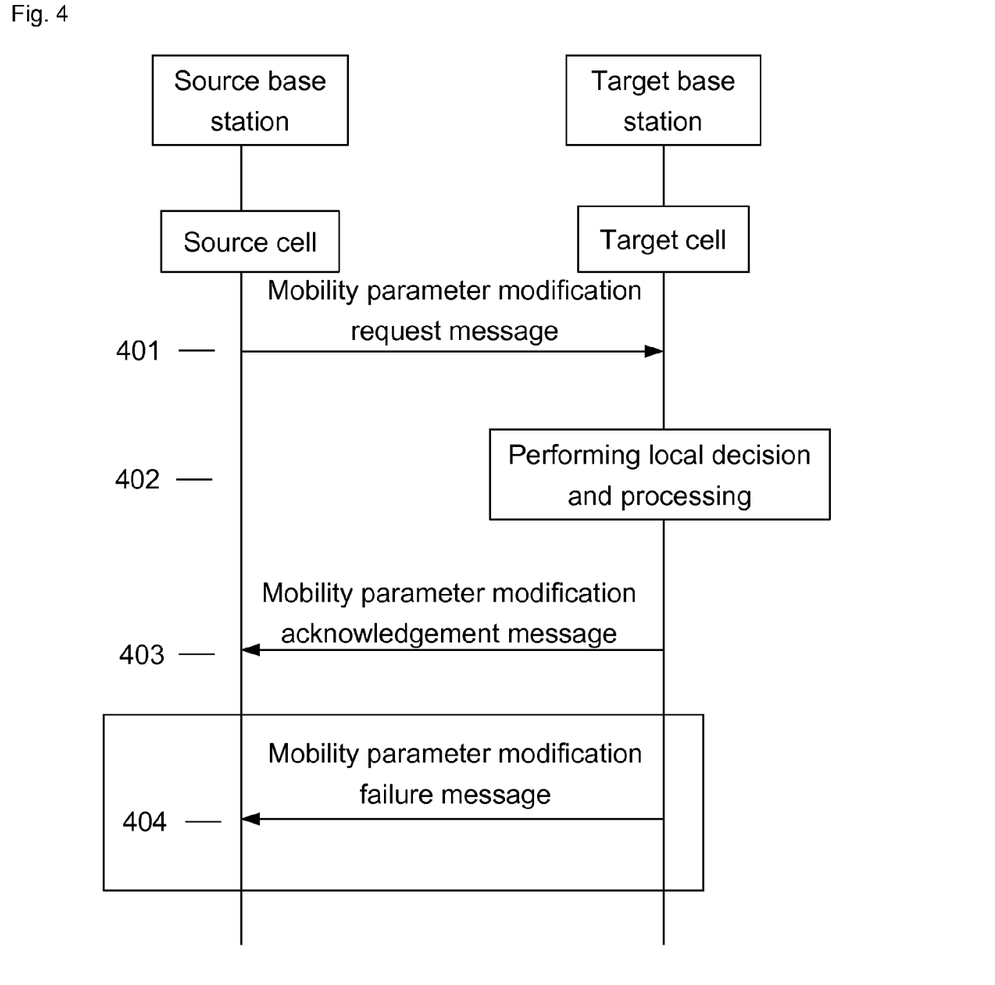
FIG. 4 shows a schematic diagram of a mobility parameter modification negotiation process of embodiment 1 of the present disclosure.

FIG. 4 shows a schematic diagram of a mobility parameter modification negotiation process of embodiment 1 of the present disclosure. As shown in FIG. 4, the mobility parameter negotiation of embodiment 1 comprises:

Step 401: the source base station sends a mobility parameter modification request message to the target base station.

The mobility parameter modification request message can be sent when necessary, e.g., when mobility parameter optimization caused by load balancing is needed, or when the mobility parameter needs to be regulated during mobility optimization. Generally, the mobility parameter modification request message comprises: a cell ID of the source cell, a cell ID of the target cell, mobility parameter information of the source base station, mobility parameter information which the target base station suggests modifying, and the cause of the mobility parameter negotiation.

Step 402: the target base station performs a local decision and processing after receiving the mobility parameter modification request message; if the processing succeeds, turn to Step 403, otherwise, turn to Step 404.

Step 403: the target cell performs a local parameter modification according to the mobility parameter suggested in the request message, and the target base station sends a mobility parameter modification acknowledgement message to the source base station.

In this embodiment, the mobility parameter modification acknowledgement message comprises: a message type, a source cell ID, and a target cell ID; and may further comprise: a source base station ID and/or a target base station ID.

Step 404: the target cell fails to perform the local parameter modification according to the mobility parameter suggested in the request message, and the target base station sends a mobility parameter modification failure message to the source base station.

In this embodiment, the mobility parameter modification failure message comprises: a message type, a reason of failure, a range of mobility parameter which the target cell of the target base station allows to be modified, a source cell ID and a target cell ID; and may further comprise: a source base station ID and/or a target base station ID.

EMBODIMENT 2

Figure 5:
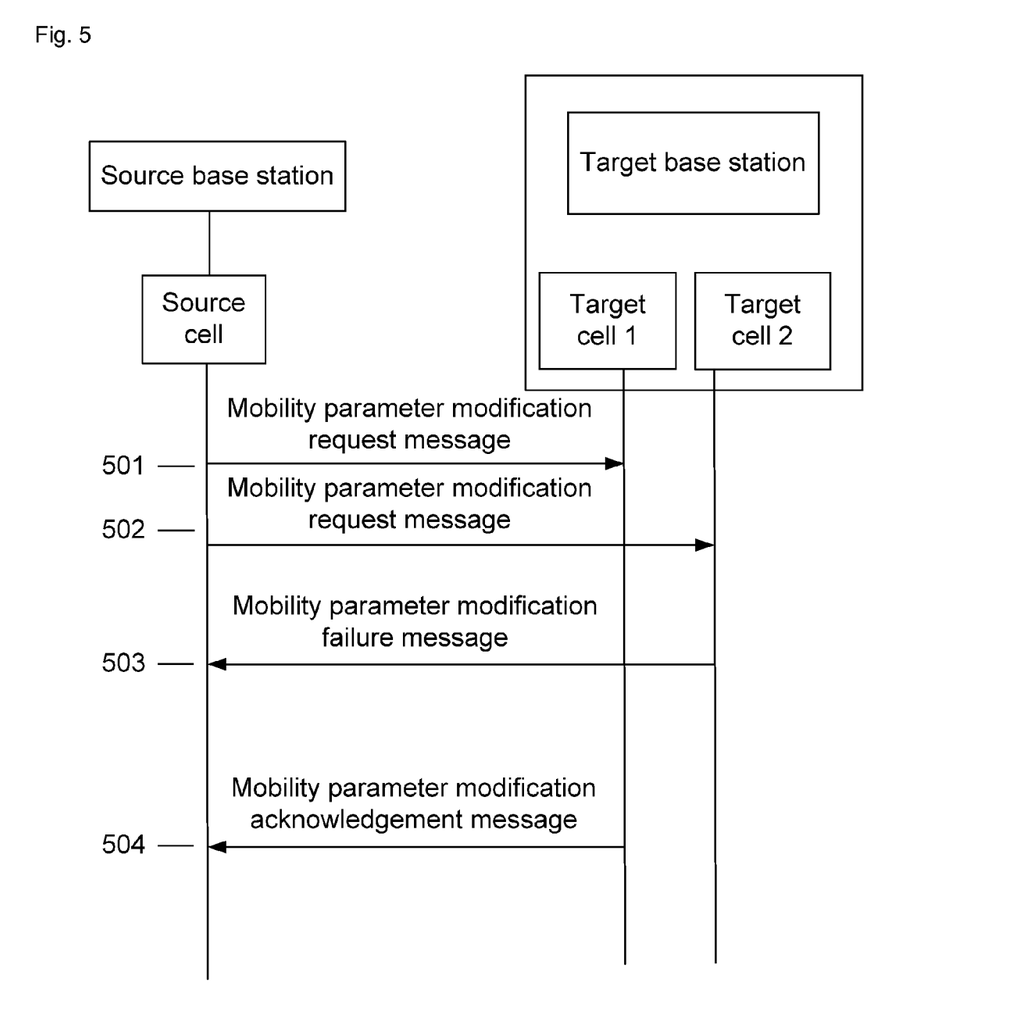
FIG. 5 shows a schematic diagram of a mobility parameter modification negotiation process of embodiment 2 of the present disclosure.

In this embodiment, a source cell performs a mobility handover parameter negotiation with a target cell 1 and a target cell 2. The negotiation with the target cell 1 succeeds and the negotiation with the target cell 2 fails. FIG. 5 shows a schematic diagram of a mobility parameter modification negotiation process of embodiment 2 of the present disclosure. As shown in FIG. 5, the mobility parameter modification negotiation of embodiment 2 comprises:

Step 501: the source cell performs a mobility handover parameter negotiation with the target cell 1, and the source base station sends a mobility parameter modification request message to the target base station.

Here, the mobility parameter modification request message comprises: a cell ID of the source cell, a cell ID of the target cell 1, the mobility parameter information of the source base station per se, the mobility parameter information which the target base station suggests modifying, and the cause of the mobility parameter negotiation.

Step 502: the target base station performs a local information judgment and determines that the mobility parameter of the target cell 1 cannot solve the handover problem caused by current load, and then a mobility parameter negotiation needs to be performed with the target cell 2. The source cell then performs a mobility handover parameter negotiation with the target cell 2. The source cell sends a mobility parameter modification request message to the target base station.

Here, the mobility parameter modification request message comprises: a cell ID of the source cell, a cell ID of target cell 2, the mobility parameter information of the source base station per se, the mobility parameter information which the target base station suggests modifying, and the cause of the mobility parameter negotiation.

Step 503: the target base station performs a local decision and a processing after receiving the mobility parameter modification request message of Step 502. When the processing to the target cell 2 fails, the target base station sends a mobility parameter modification failure message to the source base station.

In this embodiment, the mobility parameter modification failure message comprises: a message type, a reason of failure, a mobility parameter range which the target cell of the target base station allows to be modified, a source cell ID and a target cell ID 2, and may further comprise: a source base station ID and/or a target base station ID.

After receiving the mobility parameter modification failure message, the source base station may know that the current failure message belongs to the mobility parameter negotiation process performed between the source cell and the target cell 2 according to the target cell ID, and thus it will not consider that the current failure message belongs to the mobility parameter negotiation performed between the source cell and target cell 1.

Step 504: the target base station performs a local decision and a processing according to the mobility parameter modification request message of Step 501. When the processing to the target cell 1 succeeds, the target cell 1 performs a local parameter modification according to the mobility parameter in the request message and the target base station sends a mobility parameter modification acknowledgement message to the source base station.

In this embodiment, the mobility parameter modification acknowledgement message comprises: a message type, a source cell ID, and a target cell 1 ID, and may further comprise: a source base station ID and/or a target base station ID.

After receiving the mobility parameter modification acknowledgement message, the source base station may distinguish that the current acknowledgement message belongs to the mobility parameter negotiation process performed between the source cell and the target cell 1 according to the target cell ID.

It should be known that there is no strict limitation on the time sequence for the target base station sending the mobility parameter modification acknowledgement message related to the target cell 1 to the source base station and the target base station sending the mobility parameter modification failure message related to the target cell 2 to the source base station.

EMBODIMENT 3

Figure 6:
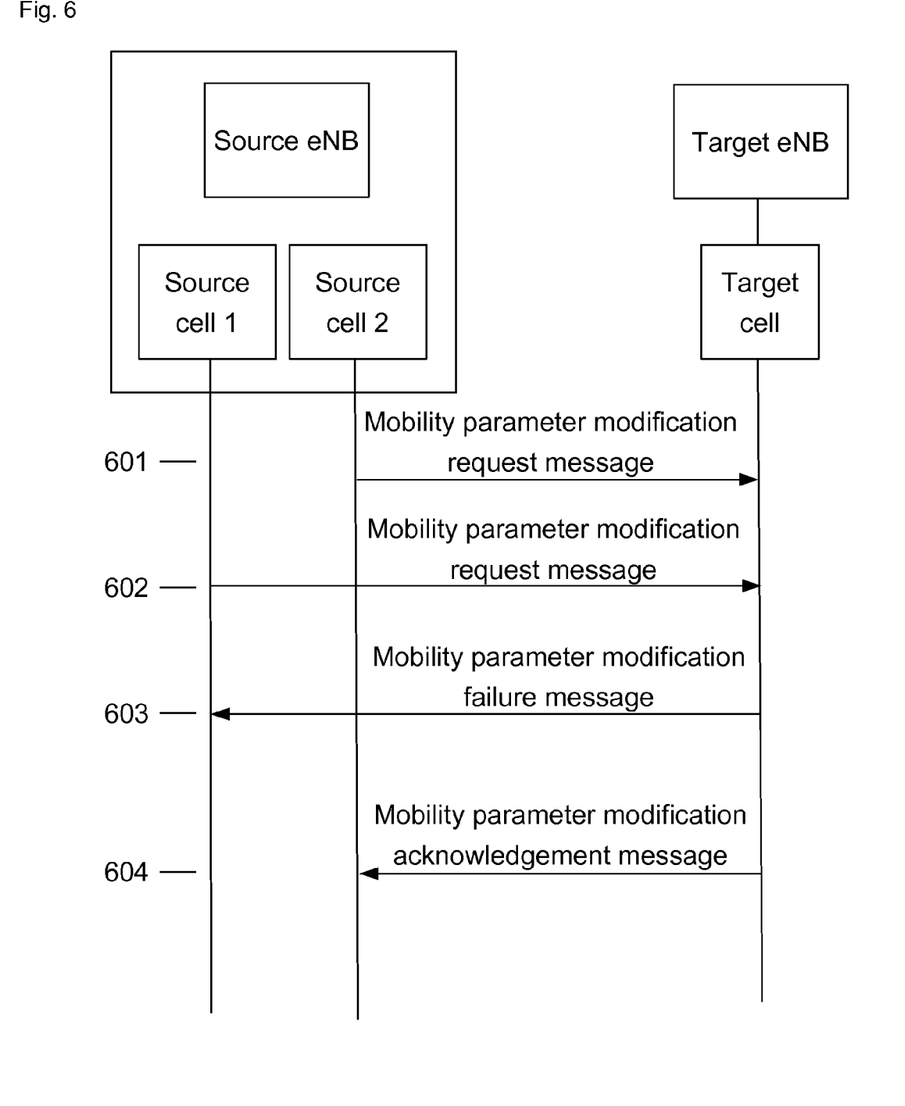
FIG. 6 shows a schematic diagram of a mobility parameter modification negotiation process of embodiment 3 of the present disclosure.

In this embodiment, both the source cell 1 and the source cell 2 perform a mobility handover parameter negotiation with the target cell. In addition, the negotiation between the source cell 1 and the target cell fails and the negotiation between the source cell 2 and the target cell succeeds. FIG. 6 shows a schematic diagram of a mobility parameter modification negotiation process of embodiment 3 of the present disclosure. As shown in FIG. 6, the mobility parameter modification negotiation of embodiment 3 comprises:

Step 601: the source cell 2 performs a mobility handover parameter negotiation with the target cell and the source base station sends a mobility parameter modification request message to the target base station.

Here, the mobility parameter modification request message comprises: a cell ID of the source cell 2, a cell ID of the target cell, the mobility parameter information of the source base station, the mobility parameter information which the target base station suggests modifying, and the cause of the mobility parameter negotiation.

Step 602: the source cell 1 performs a mobility handover parameter negotiation with the target cell and the source base station sends a mobility parameter modification request message to the target base station.

Here, the mobility parameter modification request message comprises: a cell ID of the source cell 1, a cell ID of the target cell, the mobility parameter information of the source base station per se, the mobility parameter information which the target base station suggests modifying, and the cause of the mobility parameter negotiation.

Step 603: after performing the local information judgment, the target cell determines that a mobility parameter negotiation process initiated by the source cell 2 is being performed, thus the subsequently-received mobility parameter negotiation process initiated by the source cell 1 may be rejected, i.e., the target base station sends a mobility parameter modification failure message to the source base station.

Here, the mobility parameter modification failure message comprises: a message type, a reason of failure, a mobility parameter range which the target cell of the target base station allows to be modified, a cell ID of the source cell 1, and the target cell ID, and may further comprise: a source base station ID and/or a target base station ID.

After receiving the mobility parameter modification failure message, the source base station may know that the current failure message belongs to the mobility parameter negotiation process performed between the source cell 1 and the target cell according to the cell ID of the source cell 1, and will not consider that it belongs to the mobility parameter negotiation performed between the source cell 2 and the target cell.

Step 604: when the mobility parameter negotiation process between the source cell 2 and the target cell succeeds, the target cell performs a local parameter modification according to the mobility parameter suggested in the request message, and the target base station sends a mobility parameter modification acknowledgement message to the source base station.

Here, the mobility parameter modification acknowledgement message comprises: a message type, a cell ID of the source cell 2, and the target cell ID, and may further comprise: a source base station ID and/or a target base station ID.

After receiving the mobility parameter modification acknowledgement message, the source base station may know that the current acknowledgement message belongs to the mobility parameter negotiation process performed between the source cell 2 and the target cell according to the cell ID of the target cell 2, and the mobility parameter negotiation process succeeds.

The above description is only preferred embodiments of the present disclosure and is not for limiting the present disclosure.

The invention claimed is:

1. A method for mobility parameter negotiation between base stations, comprising:
    performing, by a target base station, a mobility parameter decision and an optimization processing according to a mobility parameter modification request message received from a source base station;
    sending, by the target base station, a mobility parameter modification acknowledgement message to the source base station when the processing succeeds; and
    sending, by the target base station, a mobility parameter modification failure message to the source base station when the processing fails;
    wherein, the mobility parameter modification acknowledgement message at least includes a message type and a source cell ID,
    the mobility parameter modification failure message at least includes a message type, a reason of failure, and a source cell ID;
    the method further comprising:
    determining, by the source base station, a source cell, for which the mobility parameter negotiation is initiated, according to the source cell ID included in the mobility parameter modification acknowledgement message/the mobility parameter modification failure message, to realize a mobility parameter modification match between cell pair.

2. The method according to claim 1, wherein the mobility parameter modification acknowledgement message further comprises one or more of the following:
    a target cell ID, a source base station ID, and a target base station ID.

3. The method according to claim 1, wherein the mobility parameter modification failure message further comprises one or more of the following:
   a mobility parameter range which the target cell of the target base station allows to be modified, a target cell ID, a source base station ID and a target base station ID.

4. The method according to claim 1, wherein the cell ID is a cell global identifier (ECGI).

5. The method according to claim 2, wherein the base station ID is a base station global identifier (eNB global ID).

6. A system for mobility parameter negotiation between base stations, comprising a source base station and a target base station, wherein:
   the target base station is configured to:
      perform a mobility parameter decision and an optimization processing according to a mobility parameter modification request message after receiving the mobility parameter modification request message from the source base station;
      send a mobility parameter modification acknowledgement message to the source base station when the processing succeeds, wherein the mobility parameter modification acknowledgement message at least includes a message type and a source cell ID; and
      send a mobility parameter modification failure message to the source base station when the processing fails, wherein the mobility parameter modification failure message at least includes a message type, a reason of failure, and the source cell ID; and
   the source base station is configured to:
      determine, by the source base station, a source cell, for which the mobility parameter negotiation is initiated, according to the source cell ID included in the mobility parameter modification acknowledgement message/the mobility parameter modification failure message, to realize a mobility parameter modification match between cell pair.

7. The system according to claim 6, wherein the mobility parameter modification acknowledgement message sent by the target base station to the source base station further comprises one or more of the following:
   a target cell ID, a source base station ID, and a target base station ID.

8. The system according to claim 6, wherein the mobility parameter modification failure message sent by the target base station to the source base station further comprises one or more of the following:
   a mobility parameter range which the target cell of the target base station allows to be modified, the target cell ID, the source base station ID, and the target base station ID.

9. The system according to claim 6, wherein the cell ID in the mobility parameter modification acknowledgement message or the mobility parameter modification failure message sent by the target base station to the source base station is an ECGI.

10. The system according to claim 7, wherein the base station ID in the mobility parameter modification acknowledgement message or the mobility parameter modification failure message sent by the target base station to the source base station is an eNB global ID.

11. The method according to claim 2, wherein the cell ID is a cell global identifier (ECGI).

12. The method according to claim 3, wherein the cell ID is a cell global identifier (ECGI).

13. The method according to claim 3, wherein the base station ID is a base station global identifier (eNB global ID).

14. The system according to claim 7, wherein the cell ID in the mobility parameter modification acknowledgement message or the mobility parameter modification failure message sent by the target base station to the source base station is an ECGI.

15. The system according to claim 8, wherein the cell ID in the mobility parameter modification acknowledgement message or the mobility parameter modification failure message sent by the target base station to the source base station is an ECGI.

16. The system according to claim 8, wherein the base station ID in the mobility parameter modification acknowledgement message or the mobility parameter modification failure message sent by the target base station to the source base station is an eNB global ID.

* * * * *